United States Patent
Karri et al.

(10) Patent No.: US 11,687,317 B2
(45) Date of Patent: Jun. 27, 2023

(54) WEARABLE COMPUTING DEVICE AUDIO INTERFACE

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Akash U. Dhoot, Pune (IN); Shailendra Moyal, Pune (IN); Khader Saheb Shaik, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 17/032,045

(22) Filed: Sep. 25, 2020

(65) Prior Publication Data

US 2022/0100462 A1    Mar. 31, 2022

(51) Int. Cl.
| | |
|---|---|
| *G06F 3/16* | (2006.01) |
| *G06F 3/01* | (2006.01) |
| *G02C 7/04* | (2006.01) |
| *G06F 1/16* | (2006.01) |
| *H04W 12/50* | (2021.01) |

(52) U.S. Cl.
CPC ............. *G06F 3/167* (2013.01); *G02C 7/04* (2013.01); *G06F 1/163* (2013.01); *G06F 3/013* (2013.01); *G06F 3/017* (2013.01); *H04W 12/50* (2021.01)

(58) Field of Classification Search
CPC .......... G06F 3/167; G06F 1/163; G06F 3/013; G06F 3/017; G02C 7/04; H04W 12/50
USPC ........................................................ 704/257
See application file for complete search history.

(56) References Cited

U.S. PATENT DOCUMENTS

| | | | |
|---|---|---|---|
| 10,228,566 B2 | 3/2019 | von und zu Liechtenstein | |
| 10,353,463 B2 | 7/2019 | Shtukater | |
| 10,678,071 B2 | 6/2020 | Boss et al. | |
| 2006/0074658 A1* | 4/2006 | Chadha | G10L 17/00 |
| | | | 704/E15.045 |
| 2009/0189830 A1* | 7/2009 | Deering | G09G 3/02 |
| | | | 345/1.3 |
| 2014/0031001 A1* | 1/2014 | Jacobsen | H04M 1/05 |
| | | | 455/404.2 |
| 2015/0220249 A1* | 8/2015 | Snibbe | H04L 67/10 |
| | | | 715/719 |

(Continued)

FOREIGN PATENT DOCUMENTS

| | | |
|---|---|---|
| EP | 2995991 A1 | 3/2016 |
| WO | 2021181232 A1 | 9/2021 |

OTHER PUBLICATIONS

Elgan, M., "Why a smart contact lens is the ultimate wearable", 6 pages, May 9, 2016.

*Primary Examiner* — Stephen S Hong
*Assistant Examiner* — Broderick C Anderson
(74) *Attorney, Agent, or Firm* — Matthew Zehrer (57) ABSTRACT

An auditory signal is received by a wearable contact lens. The auditory signal is received from a user. The receiving occurring during a listening mode. The wearable contact lens positioned adjacent to an eye of the user during the receiving. A connection is made from the wearable contact lens to a paired computing device of the user. The connection is through a personal network connection. The auditory signal is transferred from the wearable contact lens, through the personal network connection, to the paired computing device of the user.

19 Claims, 4 Drawing Sheets

(56) References Cited

U.S. PATENT DOCUMENTS

| | | | | |
|---|---|---|---|---|
| 2015/0223272 | A1* | 8/2015 | Parkinson | H04M 1/6066 |
| | | | | 455/41.2 |
| 2016/0062150 | A1* | 3/2016 | Sako | G02C 11/10 |
| | | | | 351/158 |
| 2016/0080874 | A1* | 3/2016 | Fullam | G06F 3/165 |
| | | | | 381/313 |
| 2016/0155443 | A1* | 6/2016 | Khan | G06F 3/147 |
| | | | | 704/275 |
| 2016/0292925 | A1* | 10/2016 | Montgomerie | G09B 5/14 |
| 2017/0270636 | A1* | 9/2017 | Shtukater | H04N 5/2257 |
| 2019/0332168 | A1* | 10/2019 | Weldemariam | G02C 7/04 |

* cited by examiner

WEARABLE COMPUTING DEVICE AUDIO INTERFACE

BACKGROUND

The present disclosure relates to wearable computing, and more specifically, to an audio interface in a contact lens.

Wearable computing devices may include one or more computing devices that are worn on or in a body of a user. Wearable computing devices may be configured to send or receive signals to a person or to other paired computing devices. Wearable computing devices may need to be located next to or adjacent to certain parts of a user to receive signals from a user, but also without intruding into the perception and movement of the user.

SUMMARY

According to embodiments, disclosed are a method, system, and computer program product. An auditory signal is received by a wearable contact lens. The auditory signal is received from a user. The receiving during a listening mode. The wearable contact lens positioned adjacent to an eye of the user during the receiving. A connection is made from the wearable contact lens to a paired computing device of the user. The connection is through a personal network connection. The auditory signal is transferred from the wearable contact lens, through the personal network connection, to the paired computing device of the user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to wearable computing; more particular aspects relate to an audio interface in a contact lens. While the present disclosure is not necessarily limited to such applications, various aspects of the disclosure may be appreciated through a discussion of various examples using this context.

Wearable computing is increasingly becoming a popular way to interact with and use computing devices. Wearable computing may be the operation or interaction of a wearable computer that is adjacent to or in a user. Wearable computers ("wearables") may include a processor, memory, and one or more sensors or input/outputs that are configured or shaped to be worn. Often wearables are configured to interact through the user using one or more interfaces that are separate or distinct from other computing interfaces. For example, a desktop, laptop, or smartphone computing device ("non-wearable") may include a screen, a keyboard, a mouse, speakers, touchscreens, or other relevant input/output interaction interfaces ("interaction interfaces").

The interaction interfaces of non-wearables may be useful and efficient, but there are drawbacks. Non-wearables may only be useful or convenient in limited situations or use cases. For example, to use a non-wearable a user may have to sit down at a desk, put down what they are doing and type on a keyboard. In another example, to use a non-wearable a user may have to spend the time and effort to hold up, look at, and interact with the computing devices.

Wearable computers, however, have drawbacks to the interaction interfaces. A user may wish to perform computing interactions, such as look up or access data based on the environment. For example, a user may want to know information about a book or magazine, such as the persons depicted in front of the device. The user using a non-wearable may be able to type in many words or phrases to search or look up information about the magazine. The wearable may have a smaller screen or may lack a keyboard for providing input.

One emerging computing platform in the wearable computing space is smart contact lenses ("smart lenses"). A smart lens may be a contact lens that is worn on, or adjacent to the surface of an eye of the user. The smart lens may be a contact lens that provides corrective vision. The smart lens may be a lens that does not provide corrective vision. The smart lens may have embedded computing power and is capable of observing the environment of a user. For example, one or more cameras located within the smart lens may be capable of capturing images or videos. The smart lens may be capable of providing an augmented reality to a user. For example, one or more displays embedded into the smart lens may be capable of rendering text or graphics and placing them in a composited view along with a real-world environment of the user. One drawback of smart lenses is that they may not be able to receive input from a user.

Voice-based computing systems may have some benefits for use with wearable computing. Voice-based systems may include a microphone and may be communicatively coupled to a computing device. For example, a smart home assistant may be positioned in an environment of a user and may be configured to receive voice-commands and to provide responses to a user. In another example, a smartphone may have an integrated microphone that may be configured to receive voice commands of a user. In yet another example, a headset or lapel microphone may be worn by a user. The voice-based systems may have drawbacks when used with smart lenses. For example, a smart home assistant may be a stationary computing device in an environment and may only be useful in limited scenarios where a user is standing in the same room with or in a small proximity to the smart home assistant. Another drawback is that a voice-based system may be bulky or awkward to use. For example, a headset may not be useful in environments, such as a gym or workout area, where a user does not want to remember to wear the headset, or where it may be functionally difficult to use a headset.

A voice-capable contact lens (VCCL) may provide advantages over other smart lenses. A VCCL may be a wearable contact lens that is worn by a user. Specifically, the VCCL may be worn on the eye, or adjacent to the surface of the eye. The lens may be shaped and configured to correct, modify, or otherwise adjust the vision of the user. In some embodiments, the VCCL may not be configured to adjust the vision of the user. For example, the shape, thickness, or other light and/or focus adjusting properties of the lens of the VCCL may be sized and shaped to permit or enable the environment of the user to pass through to the eye without any modification or alteration of the view to the user.

A VCCL may operate by receiving one or more sounds from an environment of the user. Specifically, the VCCL may include a microphone, voice coil, or other relevant transceiver. The microphone may be on the surface of the VCCL. The VCCL may also include a processor and a memory. The processor and memory may be communicatively coupled to the microphone. The VCCL may receive an auditory signal from a person that is wearing the contact lens (e.g., the user). The microphone of the VCCL may be configured to transmit the received sounds to a processor of the VCCL.

The VCCL may further transmit the auditory signal (e.g., audio, sounds, voice, sound waves) to a paired computing device. For example, the VCCL may further include a network connection. The VCCL may be configured to connect to a smartphone through the network connection. The VCCL may transfer, after receiving audio, the received audio to a paired computing device for processing. For example, a user may be standing in a basement of a three-story building and may wish to control a network attached speaker on the third floor. The user may verbally utter "play music in the bedroom" and the microphone of the VCCL may receive the auditory signal containing the verbal utterance. The VCCL may then transmit this utterance to a smartphone that is connected to the network connection. The smartphone may act upon the utterance, by performing a processing to successfully process the request. Specifically, the smartphone may transmit, e.g., through a local area network, a command to the network attached speaker on the third floor; and responsively, the network attached speaker may begin playing music.

In some embodiments, the VCCL may be configured to perform natural language processing. For example, a VCCL may transmit an instruction to a paired computing device to perform natural language processing. Natural language processing may include various operations through hardware, software, or in some combination. For example, natural language processing may operate with one or more data sources, a search application, and a report analyzer. The natural language processing may be a computer module that analyses the received content and other information from a processor located in a VCCL or a paired computing device. Natural language processing may include performance of various methods and techniques for analyzing textual information (e.g., syntactic analysis, semantic analysis, etc.). The natural language processing may be configured to recognize and analyze any number of natural languages. In some embodiments, the natural language processing may parse passages of documents or content from a microphone of a lens worn on or in the eye of a user. Various software and/or hardware components (not depicted) of natural language processing may include, but are not limited to, a tokenizer, a part-of-speech (POS) tagger, a semantic relationship identifier, and a syntactic relationship identifier. The natural language processing may include a support vector machine (SVM) generator to process the content of topics found within a corpus and classify the topics.

In some embodiments, the tokenizer may be a computer module that performs lexical analyses. The tokenizer may convert a sequence of characters into a sequence of tokens. A token may be a string of characters included in an utterance or audio signal or a transcripted electronic document ("electronic document"). For example, an utterance may be converted from an audio signal into an electronic document and the electronic document may be converted into characters that are categorized and assigned meaning. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in utterances to correspond to a particular part of speech. The POS tagger may read an electronic document or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or audio signal.

In some embodiments, the context of a word may be dependent on one or more previously analyzed electronic documents. Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in electronic documents and audio signals. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse an utterance of an audio signal stored in an electronic document and generate corresponding data structures for one or more portions of the electronic document. For example, in response to receiving a request from a wearer of a VCCL, a processor may perform natural language processing and may output parsed text elements from the data. In some embodiments, a parsed text element may be represented in the form of a parse tree or other graph structure. To generate the parsed text element, the natural language processing may trigger computer modules including the tokenizer, the part-of-speech (POS) tagger, the SVM generator, the semantic relationship identifier, and the syntactic relationship identifier.

In some embodiments, the VCCL may be configured to identify emotions of a wearer. Specifically, each lens may include one or more external sensors, such as a wide-angle camera, or pressure sensor. The sensors may monitor the emotion of the user by capturing facial expression. The sensor data capture may be supplied to one or more secondary computing devices, such as a virtual reality ("VR") headset (not depicted). The sensor data may be used by the VR headset for playing games or to create a virtual character, such as an avatar. The sensors may be infrared emitters, configured to emitting rays around the facial surface of a user to obtain sensor data for determining facial expressions.

The sensor data may be used in combination with the audible signals. For example, a user may utter a voice command, and the audible utterance and the sensor data of the face may be transmitted to a smartphone for processing and identifying context about the command. The context may indicate the priority. For example, a user may provide an alarmed or stressed facial expression that may indicate the command has a higher priority. The sensor data may be used to determine or form patterns of behavior or preferences of the user. Specifically, the sensor data that is captured from the VCCL may be recorded along with a data and used to preserve, record, or otherwise capture the emotional state of a user while performing one or more tasks in a real-world environment. For example, a user may be instructing a camera to capture a picture by issuing an auditory utterance of "take picture." At the same time as the utterance the user may be smiling. The VCCL may capture the smiling and the utterance and an image of an environment may be captured by a paired computing device. The computing device may associate an emotion of "happy" with the captured image.

The VCCL may be configured to respond to certain eye, eyelid, or other gestures (e.g., a camera embedded into VCCL capturing hand or arm movement of a user). Specifically, using eyelid movement, a user can control when a voice command is being executed. The VCCL may be continuously tracking eye, gaze, and/or eyelid movement pattern, and based on the pattern of eye lid movement user can park already submitted voice command, reprioritize voice command, etc. For example, a gesture may be currently performed by the user. Along with receiving auditory signals that are transferred to a paired computing device, the performed gesture may be identified by the VCCL. A priority may be assigned based on the identified gesture. A priority may be adjusted based on a gesture. For example, the VCCL may be configured to assign a default priority to all auditory signals that are received. If a user blinks both eyes, and the VCCL identifies the blink, the priority of the received auditory signal may be adjusted to be a lower or higher priority. Before being sent to the paired computing device, the VCCL may assign or adjust the priority, such as by overwriting the priority from default to low or high, based on the identified gesture of blinking.

Figure 1:
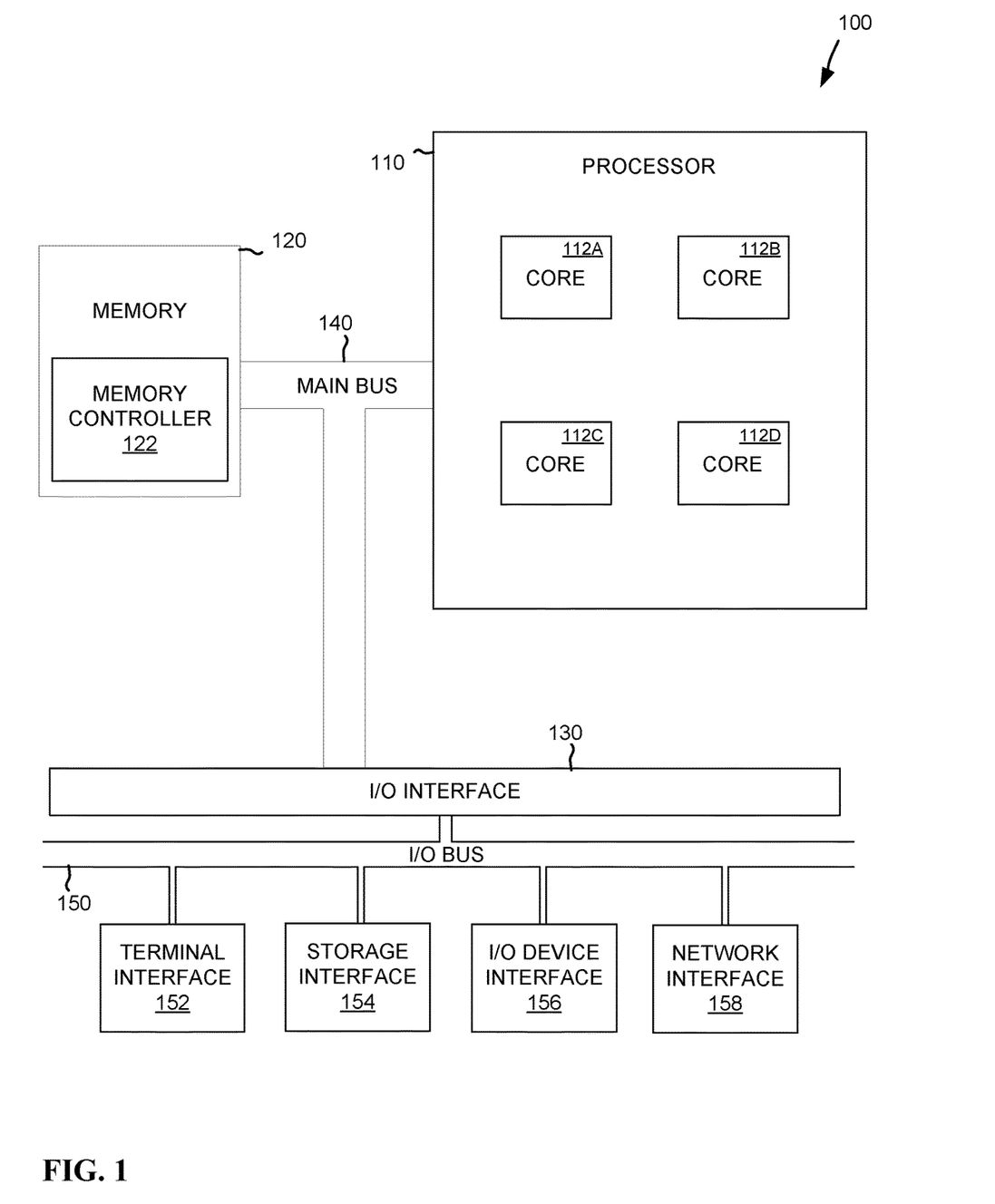
FIG. 1 depicts the representative major components of an example computer system that may be used, in accordance with some embodiments of the present disclosure.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

Figure 2:
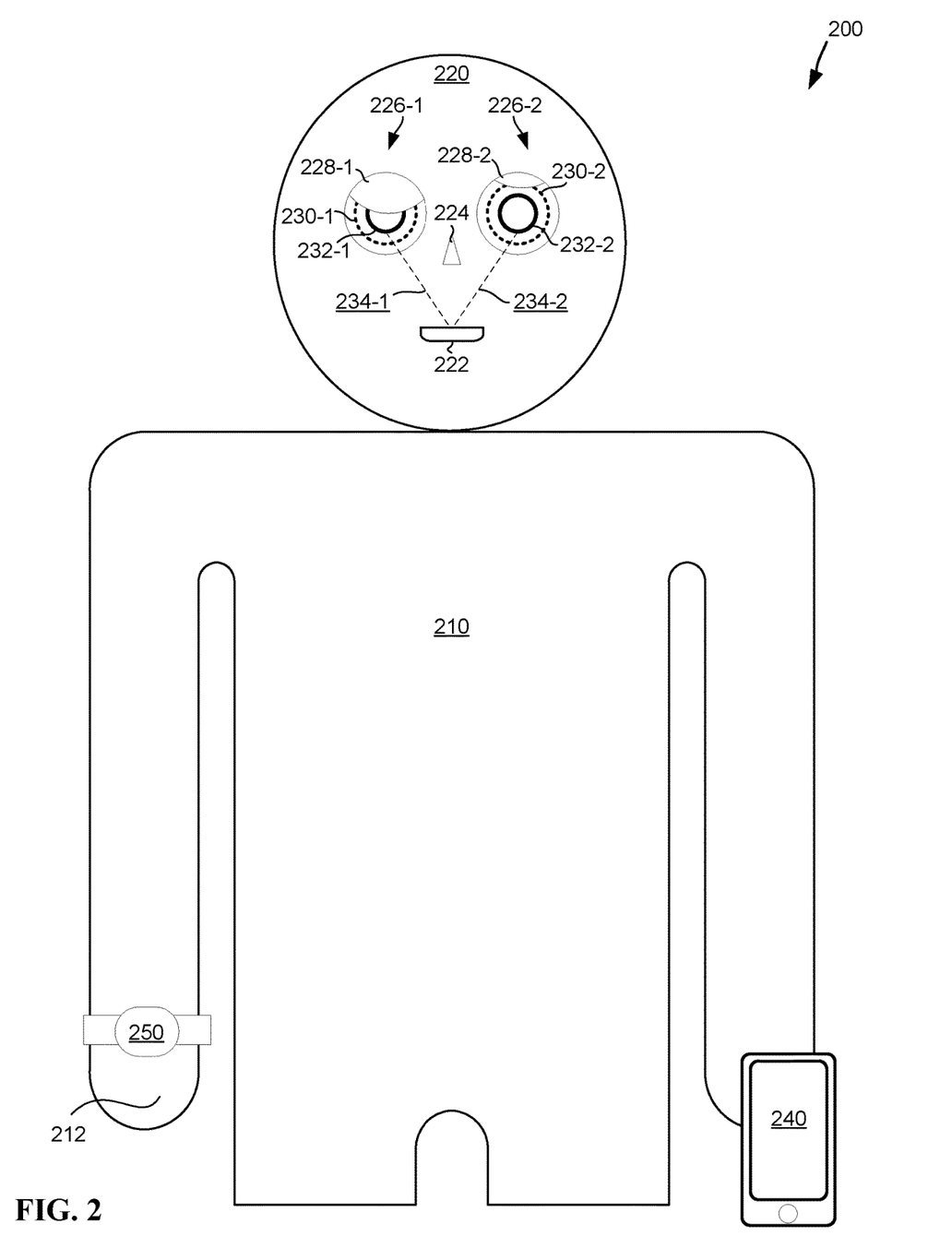
FIG. 2 depicts an example system of performing voice-based computing using a wearable contact lens, consistent with some embodiments of the disclosure.

FIG. 2 depicts an example system 200 of performing voice-based computing using a wearable contact lens, consistent with some embodiments of the disclosure. The wearable contact lens may be a VCCL consistent with some embodiments. The system 200 may be a part of a real-world scenario. Specifically, a user 210 may have appendages 212 (e.g., an arm) and a head 220. The head 220 of the user 210 may have one or more facial features including the following: a mouth 222, a nose 224, and two eyes 226-1 and 226-2 (collectively, eyes 226). The eyes 226 may include eyelids, such as eyelid 228-1 and eyelid 228-2 for eye 226-1 and 226-2, respectively.

The VCCL may include the following: two voice-capable contact lenses 230-1 and 230-2 (collectively referring to lens 230-1 and 230-2 as VCCL 230). The VCCL 230 may include two microphones 232-1 and 232-2 (collectively, microphones 232). The microphones 232 may be made of a material suited to response based on auditory signals. For instance, the microphones 232 may be composed of a relevant configuration of components (e.g., a transducer element or capsule, and a diaphragm or voice coil). The microphones 232 may be translucent, transparent, or nearly transparent—specifically, the configuration of the components may be transparent. The material of the microphones 232 may be selected from one or more of the following: fluoropolymers, polyethyleneterephthalate, polypropylene, polytetrafluoroethylene (PTFE), hexafluoropropylene (FEP), and copolymers of PTFE and FEP and the like.

The VCCL 230 may be communicatively coupled to a paired computing device. Specifically, the VCCL 230 may include a wireless network transceiver for sending and receiving networked communication through a personal network connection to paired computing devices. For example, the VCCL 230 may communicate through a personal network connection to a smartphone 240. In another example, the VCCL 230 may communicate through a personal network connection to a smart watch 250. The VCCL 230 may be configured to receive one or more auditory signals and transfer the auditory signals to the paired computing devices. Specifically, the microphones 232 may receive a voice command from the user 210 as the user speaks, utters, or otherwise audibly communicates. For example, a user 210 may verbally utter "how is the weather today?" and the microphones 232 of the VCCL 230 may receive the auditory signal from the user containing the verbal utterance. The VCCL 230 may connect to the smartphone 240 and may transmit over the personal network connection the utterance "how is the weather today?" to the smartphone. The smartphone 240 may perform natural language processing and may perform a network request through a wide area network (e.g., the Internet) to lookup information based on the utterance (e.g., to retrieve meteorological data from an Internet source).

The utterance may be transmitted to the paired computing devices in an audio-based format. The paired computing devices may be configured to provide responses in a voice-based or audio-based system format and the VCCL 230 may be prepared to format the audio response for consumption by the user. For example, a user may utter "what is the score of the football match?" and the VCCL 230 may transfer the utterance to the smart watch 250. The smart watch 250 may receive the utterance and may be unaware of the format or capabilities of the VCCL 230. For example, the smart watch 250 may be configured to understand the VCCL 230 as a headset or a voice-based smart home assistant that is communicating over a network. The smart watch 250 may respond to the utterance by retrieving from a network sports information. The smart watch 250 may transfer the information in a voice-based system format, such as a textual or audio clip. The VCCL 230 may be configured to format the response for the visual interface of the lenses 230. For example, a processor (not depicted) of the VCCL 230 may execute a speech to text algorithm on the response provided by the smart watch 250. The VCCL 230 may visually provide the information to the user 210. For example, the lenses 230 may include one or more displays that are configured to render an augmented reality view. The response that includes a score of the football match may be provided visually into a field of view of the user. This may be advantageous in situations where it is impolite or not permitted to have computing devices say information aloud or where it may not be permitted to look at or have out devices. For example, in a restricted area such as a library it may be not be permitted to interact with the smartphone 240.

The VCCL 230 may be configured to respond to gestures of the user 210. For example, one or more image sensors (not depicted) of the VCCL 230 may be configured to capture movement in the field of view of the user 210. The image sensors of the VCCL 230 may capture the user waving their arm 212 in a certain motion. The VCCL 230 may transmit the image through the personal network connection to the smartphone 240 for performing image analysis to recognize the movement of the arm 212. Upon recognition of the movement of the arm 212, the smartphone 240 may initiate an operation (e.g., taking a picture with the smartphone 240, recording sounds in the environment).

The VCCL 230 may include one or more sensors to detect movement of the face 220 of the user. Specifically, the VCCL 230 may include one or more pressure or light sensors (not depicted) that may detect the eyelids 228 of the user moving. For example, the user 210 may move a single eyelid 228-1 and the sensors of the VCCL 230 may recognize a command based on the movement of the single eyelid. The gestures of the face may be processed by the VCCL 230 concurrently with the receipt of auditory signals. For example, a user may begin by uttering a command to "message my spouse that I am working late" auditorily and the microphones 232 may receive the command. Next, and nearly contemporaneously, the user may move both eyelids 228 and pressure sensors may identify the gesture of the user moving both eyelids. Responsively, the VCCL 230 may assign a priority of the command "message my spouse that I am working late" before transferring the command to the smartphone 240. Next the user 210 may decide to stop working and may issue a gesture by moving the eyelid 228-2. Responsive to the gesture, the VCCL 230 may delay, cancel, or adjust the priority of the message. Specifically, the VCCL 230 may transmit the updated priority to the smartphone 240 regarding the command "message my spouse that I am working late."

In some embodiments, the VCCL 230 may authenticate the user 210. In detail, the user 210 may train or pair the VCCL 230 with a smartphone 240. The pairing procedure may include the user 210 placing the VCCL 230 on or adjacent to, or inserting into, the eyes 226 of the user 210. Upon placement into the eyes 226, the microphones 232 of the VCCL 230 may begin listening for auditory signals. The user 210 may be prompted by the smartphone 240 to read or speak one or more words, sentences, phrases, or otherwise make auditory signals. The distance 234-1 between the microphone 232-1 and the mouth 222 may be recorded or saved in a memory of the VCCL 230 or the smartphone 240. Likewise, the distance 234-2 between the microphone 232-2 and the mouth 222 may also be recorded or saved. Based on the distances 234-1 and 234-2 a signature of the user 210 may be generated. Sounds that are not from the user 210 may be ignored. For example, at a second time (e.g., minutes, hours, weeks) after the pairing procedure, a second user may wear or insert the VCCL 230 into the eyes of the second user. The second user may try and communicate by making auditory signals (e.g., speaking, singing, shouting) to try and operate the VCCL 230. The VCCL 230 may measure the distance between the eyes of the second user (based on a delay or volume received at microphones 232-1 and 232-2). The VCCL 230 may compare the measured distance to the signature of the user 210 and determine a mismatch (e.g., the measured distance is indicative that the eyes of the second user are not the same as the distance 234-1 and 234-2). Based on the determined mismatch the VCCL 230 may not operate when used by the second user.

In some embodiments, the VCCL 230 may perform error correction of auditory signals. For example, a user 210 may make a verbal utterance of "what time is it?" by speaking. The auditory signals may emanate from the mouth 222 and microphone 232-1 of VCCL 230-1 may record a first copy of the utterance. Simultaneously, microphone 232-2 of VCCL 230-2 may record a second copy of the utterance "what time is it?" from user 210. The VCCL 230 may each transmit the first copy and the second copy of the utterance to smart watch 250. Smart watch 250 may perform error correction or another relevant error correction algorithm on the two copies of the utterance. Based on performing the error correction algorithm, the smart watch 250 may increase the accuracy or precision in performing speech to text of the utterance "what time is it?" from the user.

In some embodiments, the VCCL 230 may perform learning on historical data. For example, VCCL 230 may be configured to identify a focal length of user 210 and a recognized object (not depicted) being viewed by user 210. The VCCL 230 may transfer the identified focal length and the recognized object to smartphone 240. The transfer may occur during processing of a verbal command received by microphone 232 of VCCL 230. In addition to generating a response to the verbal command, smartphone 240, historical data, such as the recognized object and the identified focal length, may be saved in a datastore, such as a memory of smartphone 240. The VCCL 230 and/or the smartphone 240 may perform historical learning and accordingly identify a relationship between various parts of previous requests of the user 210. For example, a relationship may be identifying between a focal distance and direction of focus of user 210, the type of auditory signals, times of day, location of user 210, and the like. Using historical learning, the VCCL 230 and/or smartphone 240 may predicting an auditory signal of the user 210. For example, a user may gaze with a focus towards a distant object and ask "what is the weather?" between the times of 6:30 am and 7:17 am on weekdays. In response to receiving auditory signals, smartphone 240 may identify gaze information from VCCL 230 and determine before processing (e.g., performing speech to text) that the user is requesting weather information, and smartphone 240 may begin retrieving weather information from an Internet-based weather information service. While the request is processing, the smartphone 240 may begin processing the auditory signals to verify that the utterance of the user 210 was in fact a weather request. Based on confirming the utterance was a weather request, the smartphone 240 may more quickly provide weather information to user 210, such as requesting weather information upon receipt of but before performing speech to text processing of an utterance of the user 210.

Figure 3A:
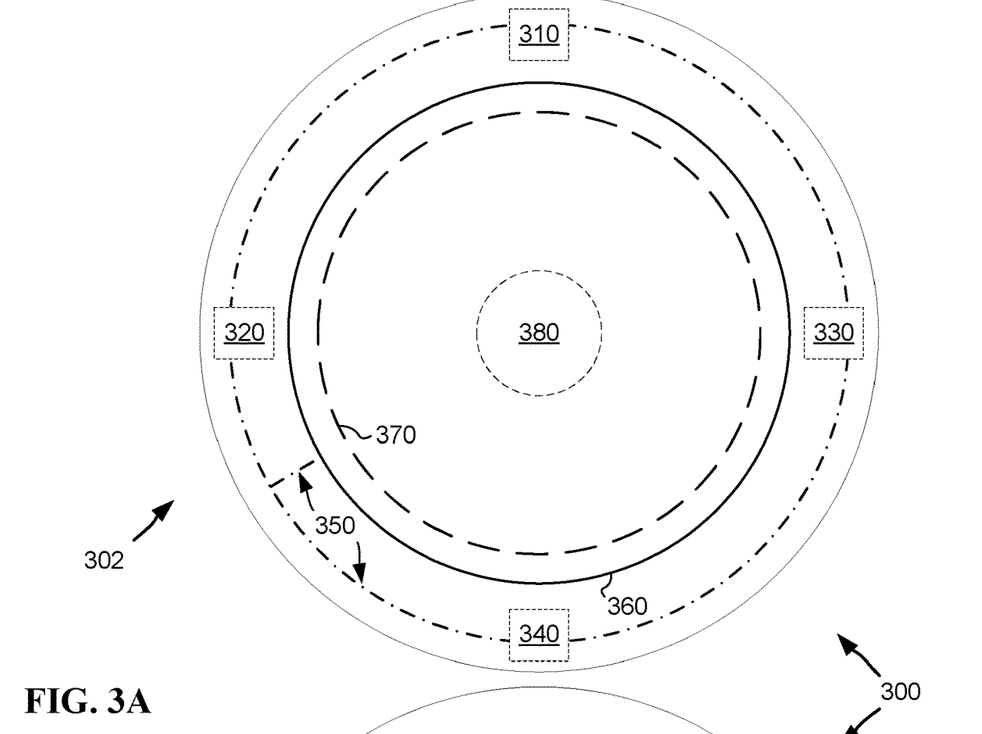
FIG. 3A depicts an outer surface of an example lens configured to receive auditory signals, consistent with some embodiments of the disclosure.

FIG. 3A depicts an outer surface 302 of an example lens 300 configured to receive auditory signals, consistent with some embodiments of the disclosure. The example lens 300 may be a VCCL, such as VCCL 230-1 or VCCL 230-2. The outer surface 302 may be configured to be distal, or away from, an eye of a wearer. For example, outer surface 302 may be primarily convex. Lens 300 may include a plurality of components embedded internally to the lens. For example, lens 300 may include the following: a processing module 310, at least one external sensor 320, a display 330, and a power source 340. The lens 300 may also include an internal lens network 350. The internal lens network 350 may include one or more communication pathways to facilitate the exchange of data and communicatively couple the internal components. The internal components and the network 350 may be positioned to avoid blocking vision of the wearer. Specifically, the wearer of the contact may have a gaze, view or vision that includes a maximum 370 and a minimum 380. When at the maximum 370, the wearer may focus such that they are able to see an entire environment including multiple entities. When at the minimum 380, the wearer may focus such that they are able to see only one or two objects in the environment The processing module 310 may include a computer system, such as computer 100. The processing module 310 may be a system-on-a-chip computing system. Specifically, the processing module 310 may include a processor, memory, wireless transceiver, and other components (not depicted). The processing module 310 may be configured transfer data to and receive data from a paired computing device. For example, processing module 310 may utilize the wireless transceiver to connect with a smartphone and to send and receive data through the connection.

The at least one external sensor 320, may be a single sensor, such as a camera or other relevant imaging sensor. The external sensor 320 may be configured to capture images outwardly, such as to capture a view or gaze of a wearer of the lens 300. The external sensor 320 may be another type of sensor, such as a pressure sensor to capture movement of an eye or an eyelid of a user, or to capture a direction, view, shape, focal length, or other eye-related information of a user. The external sensor 320, may be a plurality of sensors. For example, sensor 320 may include a visual sensor to observe an environment and capture images. Further, sensor 320 may also be a light sensor configured to determine a gesture such as a blink, wink, eyelid movement, open eyes, closed eyes, and the like. Still further, sensor 320 may also be a focus sensor configured to measure the gaze of a user.

The display 330 may be an embedded display configured to present information to the user. For example, the display 330 may be an augmented reality display configured to composite information from a computing device, such as a paired computing device (not depicted) or the lens 300, and an environment. The display 330 may configured to extend across a visual section of the lens 300. For example, the display 330 may be distributed across the maximum 370 of the vision of a wearer. The power source 340 may be a battery, such as a lithium, polymer, or other relevant battery technology. The power source 340 may be a kinetic power source. For example, the power source 340 may receive a charge or capture electric energy, based on the movement of a wearer or based on movement of eyes, eyelids, or another relevant portion of the wearer. In another example, as the wearer moves around, the relative position of the lens 300 may be changed with respect to a gravitational attraction to the Earth, and the power source 340 may capture the changing forces on the lens 300 based on the movement. The power source 340 may be a receiver, configured to receive electricity from an external source. For example, the power source 340 may receive a radio wave, or another relevant signal, periodically from a paired computing device, and responsive to the periodically radio waves, the power source 340 may convert the energy into electricity for the lens 300.

The lens 300 may also include a microphone 360. The microphone 360 may be located on, or adjacent to, the outer surface 302 of the lens 300. For example, from FIG. 3A, the microphone 360 may be located on or over the other parts or components of the lens 300. The microphone 360 may be attached to the outer surface of the lens 300 by way of an adhesive, such as a transparent glue. The microphone 360 may be integrally coupled to the lens 300. For example, the lens 300 may be constructed by molding a polymer or other transparent material on the outer surface 302. The area of the lens 300 where there is no microphone, outside of circle 360, may be of a first thickness. The area of the lens 300 where there is microphone 360, inside of circle 360, may be of a second thickness. The second thickness may be less than the first thickness, to form a void (not depicted) or space between the outer surface 302 and an inner surface of the lens 300. The void may be configured to allow movement along an internal axis (not depicted), the internal axis extending through the lens 300 from the outer surface 302 to an inner surface. In some embodiments, the microphone 360 may be sprayed onto the lens 300. For example, the microphone 360 may be a particulate that include sound-reactive material and adhesive. A machine may spray the microphone 360 onto the lens 300 within the bounds of circle 360. The microphone 360 may extend over a majority of the outer surface 302.

The microphone 360 may be constructed of a transparent material that is sensitive to sound waves or auditory signals. For example, the microphone 360 may be a magnetic coil material that is transparent. In another example, the microphone 360 may include a plurality of magnetic particles interspersed with transparent particles into a coil configured to receive sound waves or auditory signals. The microphone 360 may extend beyond the visual area of a wearer. For example, the microphone 360 may be of a diameter larger than a possible maximum 370 view or gaze that a wearer may be able to perceive or view while wearing lens 300. The microphone 360 may be configured to be sensitive only to the user (a wearer of the lens 300). For example, the range or distance of sensitivity of receiving auditory signals by microphone 360 may be less than one foot. In another example, a sound or utterance that is beyond three feet of lens 300 may not be detected by microphone 360. Microphone 360 may be communicatively coupled to internal lens network 360 and may be configured to provide auditory signals to the other components of lens 300. For example, microphone 360 may be configured to translate sound waves from a wearer into auditory signals. Microphone 360 may transfer the auditory signals to processing module 310 through internal lens network 360.

Figure 3B:
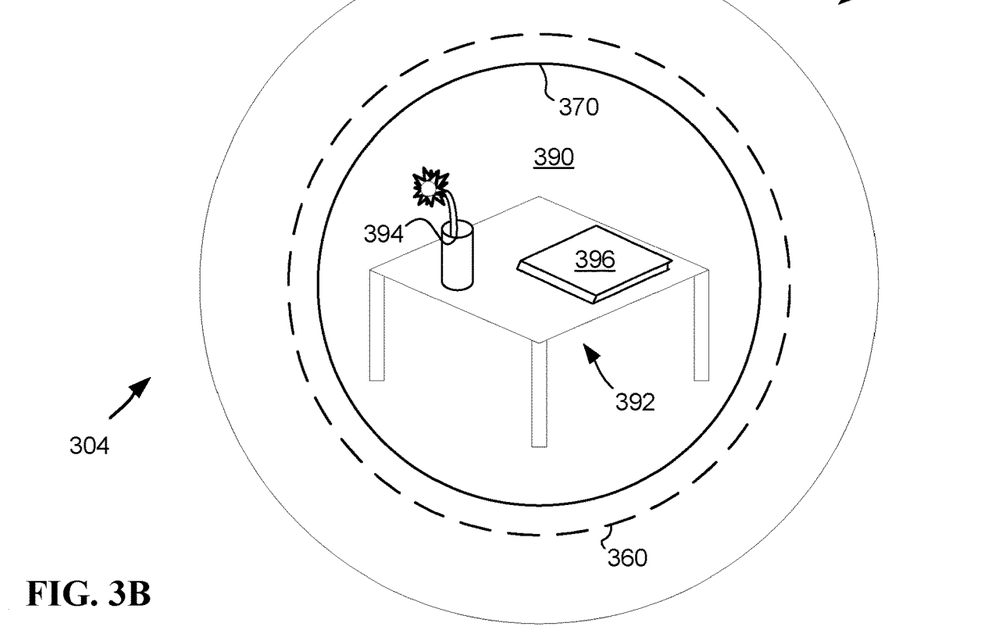
FIG. 3B depicts an inner surface of the example lens configured to receive auditory signals, consistent with some embodiments of the disclosure.

FIG. 3B depicts an inner surface 304 of the example lens 300 configured to receive auditory signals, along with an environment that may be viewed by the lens 300, consistent with some embodiments of the disclosure. Inner surface 304 may be configured or shaped to be placed on, or adjacent to the outer surface of an eye of a wearer. For example, inner surface 304 may be primarily concave. Lens 300 may be configured to permit viewing of example environment that may be viewed by a wearer. An environment may include a plurality of real-world elements, such as people, places, buildings, objects, animals, plants, and the like. At a first time, depicted in FIG. 3B, environment 390 may include a table 392, a flower 394, and a book 396.

The lens 300 may be configured to respond to verbal requests or other auditory signals of a wearer. For example, while viewing environment 390, a user may speak a verbal command in the form of a speech or utterance. The microphone 360 of lens 300 may vibrate, sense, or otherwise receive, the sound waves of the utterance. The lens 300 may receive auditory signals from the microphone 360 and may perform processing or may pass processing to another device. In a first example, lens 300 may receive a verbal command through microphone 360 to begin listening. Further, the microphone 360 may be continually listening in a wake mode. While in the wake mode, microphone 360 may transfer auditory signals periodically (e.g., every 100 milliseconds) to processing element 310. Processing element 310 may be configured to identify a wake word (e.g., "begin listening," "contact wake up"). The lens 310 may operate in the wake mode by default. For example, the lens 310 may operate in a wake mode when not operating in an active mode or a listen mode for processing auditory signals and responding to commands, questions, and auditory signals other than one to initiate listening. In some embodiments, external sensor 320 may receive a gesture command to begin listening. A user may speak an utterance about questions that are unrelated to the environment 390, and responsively, the lens 300 may process the question. For example, a wearer may ask for the time, the microphone 360 may receive the question and pass the question to processor 310. Processor 310 may determine a response to the time, and may provide a visual depiction (e.g., pixels that render roman numerals of the time) to display 330.

A user may speak an utterance about the environment that are related to the environment 390. For example, a user may focus or gaze towards the flower 394 and may utter verbally "what type of flower is this?" while wearing lens 300. External sensor 320 may be configured to observe the environment in response to the gaze of the user between a maximum 370 and minimum 380 view of environment 390. The external sensor 320 may be configured to observe the environment, responsive to the utterance. For example, processing element 310 may be configured to parse "what type of flower is this?" and may determine based on the content of the utterance, that the user is asking a question about something within a field of view or something related to a gaze of the user. The processing element 310 may be configured to perform parsing contemporaneously with receiving the utterance. For example, during each word of the phrase "what type of flower is this?" the microphone 360 may be transferring the question to the processing element 310 word-by-word. As the processing element 310 receive the word "type" in the phrase "what type of flower is this?", the lens 300 may determine that the user is requesting information about something visual, and may responsively instruct external sensor 320 to activate and begin capturing information about environment 390 and the gaze of the wearer. For example, external sensor 320 may be operating in a deactivated mode, and while in the deactivated mode external sensor 320 may not be capable of capturing a view of an environment. The external sensor 320 may default to operating in the deactivate mode, e.g., to reduce or eliminate a power draw by external sensor 320 from power source 340. External sensor 320 may identify from the gaze of the wearer, that flower 394 is the subject of the environment 390 that the verbal utterance "what type of flower is this?" is directed towards. Lens 300 may transfer the verbal utterance "what type of flower is this?" to a paired computing device for further processing, along with a capture of the environment 390 by external sensor 320. Lens 300 may receive a response in the form of auditory data "The flower is a daisy." Processing element 310 may perform speech to text processing to convert the auditory data "The flower is a daisy." and render the received auditory data as visual text "The flower is a daisy." in display 330 for the viewing of a wearer of lens 300.

Lens 300 may operate based on predicting a request of a wearer. In detail, lens 300 may be configured analyze a voice command received from microphone 360 and to identify from external sensor 320 if the eye of the wearer is focused on a certain object (e.g., book 396). If lens 300 activates external sensor 320, and the focus or gaze is determined, processing element 310 may capture and record the historical information of the command and the eye focus, gaze, and/or direction. Based on historical learning, lens 300 may predict if the auditory signal has any correlation with eye focus direction, and accordingly, lens 300 may operate by performing a capture based on receiving a verbal utterance from microphone 360, but before processing element 310 has a chance to process, or transfer to a paired computing device for processing, the verbal utterance.

For example, lens 300 may identify a gaze of the user in response to determining that a verbal utterance received from microphone 360 was a capture command. The processing element 310 may record information regarding the gaze of the user contemporaneous with the capture command. Specifically, processing element 310 may have a buffer, cache, or other memory that may record the various eye, focus, and/or gaze of the user for a few seconds before and during the capture command. The lens 300 may identify a second gaze of the user. The lens 300 may determine a capture intent of the user. Specifically, processing element 310 of the lens 300 may compare the second gaze to the recorded gaze information from the earlier capture command. Responsive to determining the capture intent of the user, the lens 300 may instruct external sensor 320 to perform a second image capture.

Figure 4:
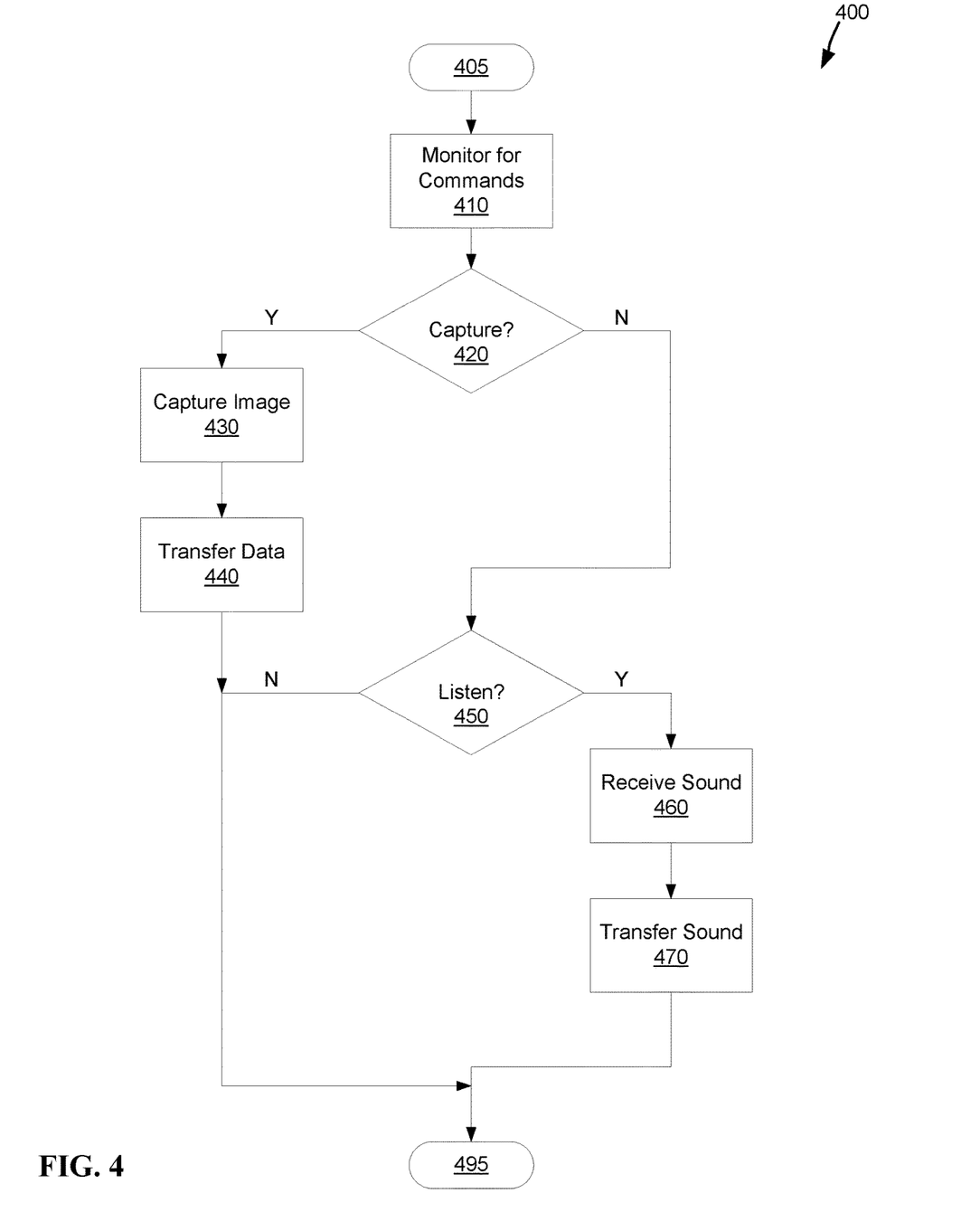
FIG. 4 depicts an example method of receiving auditory signals and responding to commands of a user, consistent with some embodiments of the disclosure.

FIG. 4 depicts an example method 400 of receiving auditory signals and responding to commands of a user, consistent with some embodiments of the disclosure. Method 400 may be performed by a contact lens, such as VCCL 230. Method 400 may be performed by a paired computing device, such as smartphone 240. Some portions of method 400 may be performed by a lens, and other portions by a paired computing device.

From start 405, method 400 begins by monitoring for commands 410. The commands may come in the form of verbal commands. For example, one or more auditory signals may be received by a transparent lens of a VCCL 230 during monitoring. The commands may come in the form of gestures. For example, one or more eye, gaze, focus, eyelid, head movement, or arm gestures may be performed and may be received by a VCCL. The monitoring for commands may also include the transfer of the commands to a paired computing device such as a smart watch or smartphone. The commands may be processed by a VCCL. In some embodiments, the commands may be passed onto a paired computing device for processing. In some embodiments, only certain commands may be monitored for at 410 by a VCCL. For example, a VCCL may operate in a wake mode and may be continually listening for only a rudimentary set of sounds or noises. A user speaking or a user speaking a wake word may constitute the type of monitoring of a VCCL under certain circumstances. The VCCL may be configured to only respond to a word or command or a mode switching request of a user but otherwise may not be responsive. In some embodiments, the commands may be received from a paired computing device. For example, a personal network connection between a VCCL and a smartphone may permit the sending and receiving of data. Based on the smartphone determining that a pervious verbal utterance of a user, contained in an auditory signal transmitted from the VCCL, indicates that a user wants to perform an action, the smartphone may send a particular command over the personal network connection to the VCCL.

If the command is a capture command at 420:Y, then a VCCL may initiate a capture of an image at 430. The capture of an image may include a command to instruct a camera to activate or become operational in an activated mode. During the activated mode the camera may receive visual information. The camera may be a part of a VCCL, such as an integrated camera configured to capture an environment of a user. The camera may be configured to operate in a deactivated mode when not initiated to capture an image at 430. The capture may be of a series of images, such as a video. At 440 the captured image may be transferred to a paired computing device. For example, an image may be transferred after a connection to paired computing device of a wearer of the VCCL is established. In some embodiments, other data besides an image may be transferred. For example, a VCCL may record or associate other data, such as a timestamp or certain eye movement that are contemporaneous with the period of time surrounding the capture of the image, to the captured image. The other data and the associated captured image may be transferred together to the paired computing device.

If the command is a listen command at 450:Y, then a VCCL may begin receiving auditory signals, such as verbal command, auditory utterances, and other sounds at 460. The sound may be received for a predetermined period of time. For example, upon a VCCL entering a listening mode, a timer may be initiated internally by a processing element of the VCCL. The timer may be determined based on a single predetermined value (e.g., listening for 10 seconds, listening for 4 seconds). The sound may be received for a plurality of predetermined periods of time. For example, based on a first listen command being received at 410, the VCCL may perform in a listening mode to receive sounds at 460 for ten seconds. Further, based on a second listen command being received at 410, the VCCL may perform in a listening mode for two minutes (e.g., for dictation purposes). The VCCL may receive sound while in the listening mode until the user stops talking. For example, upon entering a listening mode, the VCCL may continue to receive auditory signals of a wearer until auditory signals no longer are above a predetermined listen threshold. The predetermined listen threshold may be auditory signals above a certain decibel level. The predetermined listen threshold may be auditory signals above a certain decibel level continuously, or nearly continuously (e.g., above 25 decibels every 1800 milliseconds). After receiving the auditory signal, the VCCL may terminate the listening mode and may reenter a pending or wake mode and resume waiting for a wake signal (e.g., monitoring for commands at 410). The VCCL may be configured to terminate the listening command in response to receiving another command from the wearer. For example, a wearer may verbally utter "stop listening" and responsively, the VCCL may terminate the listening mode.

The received sound may be transferred to a paired computing device at 470. The transfer of the received sound may include establishing or reestablishing of a connection to the paired computing device. For example, a VCCL and a smartphone may have previously been communicatively coupled through a wireless personal network connection. The personal network connection may permit data to be sent wirelessly between the two devices while connected and may also permit the two devices to operate in a sleep mode. While in the sleep mode, either the VCCL or the paired computing device may unilaterally reconnect to each other by sending a resume communication signal.

After the sound is transferred at 470 method 400 ends at 495. In some embodiments, method 400 may loop after the sound is transferred at 470 continue monitoring for commands at 410.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   receiving, by a wearable contact lens and during a listening mode, an auditory signal from a user, the wearable contact lens positioned adjacent to an eye of the user during the receiving;
   identifying a priority of the auditory signal;
   identifying, by the wearable contact lens, an action performed by the user;
   adjusting, by the wearable contact lens and based on the action, the priority of the auditory signal;
   connecting, from the wearable contact lens and through a personal network connection, to a paired computing device of the user; and
   transferring, from the wearable contact lens through the personal network connection, the auditory signal and the priority of the auditory signal to the paired computing device of the user.

2. The method of claim 1, wherein the method further comprises:
   detecting, by the wearable contact lens, a listen command to begin receiving auditory signals; and
   initiating, by the wearable contact lens, the listening mode.

3. The method of claim 2, wherein the listen command is the action performed by the user.

4. The method of claim 2, wherein the method further comprises:
   receiving, by the wearable contact lens, a second command; and
   terminating, by the wearable contact lens and based on the second command, the listening mode.

5. The method of claim 2, wherein the listen command is received from the paired computing device through the personal network connection.

6. The method of claim 2, wherein the listening mode is initiated for a predetermined period of time, and wherein the method further comprises:
   terminating, by the wearable contact lens and based on the predetermined period of time, the listening mode.

7. The method of claim 2, wherein the listen command is an auditory command of the user, and wherein the wearable contact lens operates in a wake mode when not operating in the listening mode.

8. The method of claim 1, wherein the wearable contact lens includes a camera for capturing an image of an environment of the user, and wherein the method further comprises:
   receiving, by the wearable contact lens, a capture command;
   parsing, by the wearable contact lens, the capture command; and
   initiating, by the camera of the wearable contact lens, an image capture of a view of the user.

9. The method of claim 8, wherein the camera operates in a deactivated mode, and wherein the method further comprises:
   activating, by the wearable contact lens and in response to the capture command and before the image capture, the camera of the wearable contact lens.

10. The method of claim 8, wherein the capture command is the action performed by the user.

11. The method of claim 8, wherein the method further comprises:
    identifying, by the wearable contact lens and in response to the capture command, a gaze of the user;
    recording, by the wearable contact lens, a gaze recording of the gaze of the user contemporaneous with the capture command;
    identifying, by the wearable contact lens, a second gaze of the user;
    determining, by the wearable contact lens and based on the second gaze and based on the gaze recording a capture intent; and
    initiating, by the camera of the wearable contact lens and based on the capture intent, a second image capture of a second view of the user.

12. The method of claim 11, wherein the second image capture is initiated before parsing a second capture command.

13. The method of claim 1, wherein the auditory signal is a voice command of the user, and wherein the wearable contact lens includes a display configured to provide visual information to the user, and wherein the method further comprises:
    receiving, by the wearable contact lens, a response to the voice command; and
    rendering, by the display of the wearable contact lens, the response.

14. A system, the system comprising:
    a memory, the memory containing one or more instructions; and
    a processor, the processor communicatively coupled to the memory, the processor, in response to reading the one or more instructions, configured to:
    receive, by a wearable contact lens and during a listening mode, an auditory signal from a user, the wearable contact lens positioned adjacent to an eye of the user during the receiving;

identify a priority of the auditory signal;
identify, by the wearable contact lens, an action performed by the user;
adjust, by the wearable contact lens and based on the action, the priority of the auditory signal;
connect, from the wearable contact lens and through a personal network connection, to a paired computing device of the user; and
transfer, from the wearable contact lens through the personal network connection, the auditory signal and the priority of the auditory signal to the paired computing device of the user.

15. The system of claim 14, wherein the auditory signal is a voice command of the user, and wherein the wearable contact lens includes a display configured to provide visual information to the user, and wherein processor is further configured to:
receive, by the wearable contact lens, a response to the voice command; and
render, by the display of the wearable contact lens, the response.

16. The system of claim 15, wherein response is rendered as part of an augmented reality image that includes the response and a view of the user.

17. A computer program product, the computer program product comprising:
one or more computer readable storage media; and
program instructions collectively stored on the one or more computer readable storage media, the program instructions configured to:
receive, by a wearable contact lens and during a listening mode, an auditory signal from a user, the wearable contact lens positioned adjacent to an eye of the user during the receiving;
identify a priority of the auditory signal;
identify, by the wearable contact lens, an action performed by the user;
adjust, by the wearable contact lens and based on the action, the priority of the auditory signal;
connect, from the wearable contact lens and through a personal network connection, to a paired computing device of the user; and
transfer, from the wearable contact lens through the personal network connection, the auditory signal and the priority of the auditory signal to the paired computing device of the user.

18. The computer program product of claim 17, wherein the program instructions are further configured to:
detect, by the wearable contact lens, a listen command to begin receiving auditory signals; and
initiate, by the wearable contact lens, the listening mode.

19. The computer program product of claim 18, wherein the listening mode is initiated for a predetermined period of time, wherein the program instructions are further configured to:
terminate, by the wearable contact lens and based on the predetermined period of time, the listening mode.

\* \* \* \* \*